United States Patent [19]

Køhnke

[11] Patent Number: 4,801,268
[45] Date of Patent: Jan. 31, 1989

[54] MANIKIN FOR PRACTICING ARTIFICIAL RESPIRATION

[75] Inventor: Ole B. Køhnke, Frederiksberg, Denmark

[73] Assignee: Ambu International A/S, Glostrup, Denmark

[21] Appl. No.: 181,525

[22] Filed: Apr. 14, 1988

[30] Foreign Application Priority Data

Apr. 15, 1987 [DK] Denmark .............................. 2002/87

[51] Int. Cl.⁴ ............................................. G09B 23/28
[52] U.S. Cl. .................................................. 434/265
[58] Field of Search ....................... 434/265, 267, 270

[56] References Cited

U.S. PATENT DOCUMENTS 3,049,811  8/1962  Ruben ................... 434/265
4,001,950  1/1977  Blumensaadt .......... 434/265

Primary Examiner—Maryann Lastova
Assistant Examiner—Valerie Szczepanik
Attorney, Agent, or Firm—Cushman, Darby & Cushman

[57] ABSTRACT

A manikin for practicing artificial respiration by the mouth-to-mouth or mouth-to-nose method and comprising an inflatable lung element, a chest element and a head element having a cavity containing a replaceable bag surrounded by an elastically expandable cover having a predetermined internal volume in its state of rest, the bag having an air inlet which is airtightly connected with a replaceable mouth and nose element and the cavity in the head element being connected with the lung element through an air duct. The manikin does not malfunction in case of a leakage in the secondary air system.

5 Claims, 3 Drawing Sheets

MANIKIN FOR PRACTICING ARTIFICIAL RESPIRATION

BACKGROUND OF THE INVENTION

This invention relates to a manikin for practising artificial respiration by the mouth-to-mouth or mouth-to-nose method, said manikin comprising an inflatable element simulating a lung (in the following referred to as the lung), an element simulating a chest (in the following referred to as the chest) and a hollow element simulating a head (in the following referred to as the head), said head having a cavity containing a replaceable inflatable bag having an air inlet which is airtightly connected with a replaceable element simulating a mouth and nose, the cavity in the head being connected with the lung through an air duct.

Danish patent specification No. 137.206 describes a manikin of the above mentioned type.

The replaceable inflatable bag of the prior art manikin is preferbly made from a non-elastic material and it has such a shape that it collapses when the lung returns to its non-inflated state which occurs when the user removes his mouth from the nose and mouth element of the manikin and allows the pressure within the bag to return to atmospheric pressure. Concurrently with the collapse of the bag, air which during the inflation of the bag was introduced into the cavity of the head and further into the lung through the air duct flows back to the cavity in the head.

If the secondary air system, i.e. that part of the cavity of the head which surrounds the bag, the air duct and the lung, leaks—and in practise leakages often occur—air will pass from the secondary air system to the surround atmosphere during the inflation of the lung.

Therefore, the bag does not collapse completely when the lung has returned to its non-inflated state.

Consequently, a reduced amount of air will be introduced into the air duct and the lung during a new inflation of the bag and the amount of air introduced will decrease further during each subsequent cycle.

Due to the accumulating amounts of air in the bag even minor leakages in the secondary air system will cause such changes during each practising cycle that the manikin gradually ceases to function anatomically correct and in a reproducible manner.

It has been attempted to use a bag of an elastic material, e.g. a rubber balloon, but in that case the simulation of the resistance against inflation of the lung and the chest rather depends on the properties of the rubber balloon than on the properties of the lung, and consequently the use of the manikin becomes less realistic. Furthermore, such a rubber balloon has to meet high quality requirements which make the balloon expensive and increase the costs of practising. Thus, for hygienic reasons and in particular in order to reduce the risk of spreading of infectious matter a new balloon has to be inserted when a new person starts practising.

SUMMARY OF THE INVENTION

The object of the invention is to eliminate or reduce the above mentioned drawbacks caused by leakages, if any, in the secondary air system.

This object and other objects which will appear from the following description are achieved by the manikin of the invention which manikin is characterized in that the bag is surrounded by an elastically expandable cover having a predetermined internal volume in its state of rest.

The elastically expandable cover ensures tha the bag following each cycle, i.e. inflation followed by deflation by pressure relief, collapses to the same extent i.e. corresponding to the internal volume of the cover in its state of rest. Consequently, there will be no accumulation of air in the bag even after extended use of the manikin.

It is unnecessary to replace the elastically expandable cover after each person's use of the manikin because the cover is not contacted by the expiration air of the user. Thus, it is possible to use a relatively expensive cover without any significant increase in the costs of using the manikin.

The use of a combination of a bag and a surrounding elastically expandable cover also presents the advantage that it is possible to use a simple and inexpensive bag. Thus, the bag may be prepared from an inexpensive plastic film or paper.

The cover does not have to be airtight and it should only be capable of ensuring that the bag collapse in a reproducible manner and should not present an unacceptable resistance against expansion.

The cover is preferably tubular, and in a particularly preferred embodiment of the invention the cover consists of a woven or knitted tubular member wholly or partially consisting of elastic threads or yarn.

A tubular dressing material which is commercially available under the trade mark SURGIFIX is a particularly suitable cover material.

The cover is preferably permanently attached to the head because it does not have to be replaced when the bag is replaced.

In case of minor leakages in the secondary air system a subatmospheric pressure may be created in connection with the collapse of the bag caused by the cover. In such cases it is preferably to provide a one-way valve in the secondary air system, the one-way valve allowing air to flow from the surrounding atmosphere into the secondary air system when the pressure within the secondary air system is subatmospheric.

DESCRIPTION OF A PREFERRED EMBODIMENT

Figure 1:
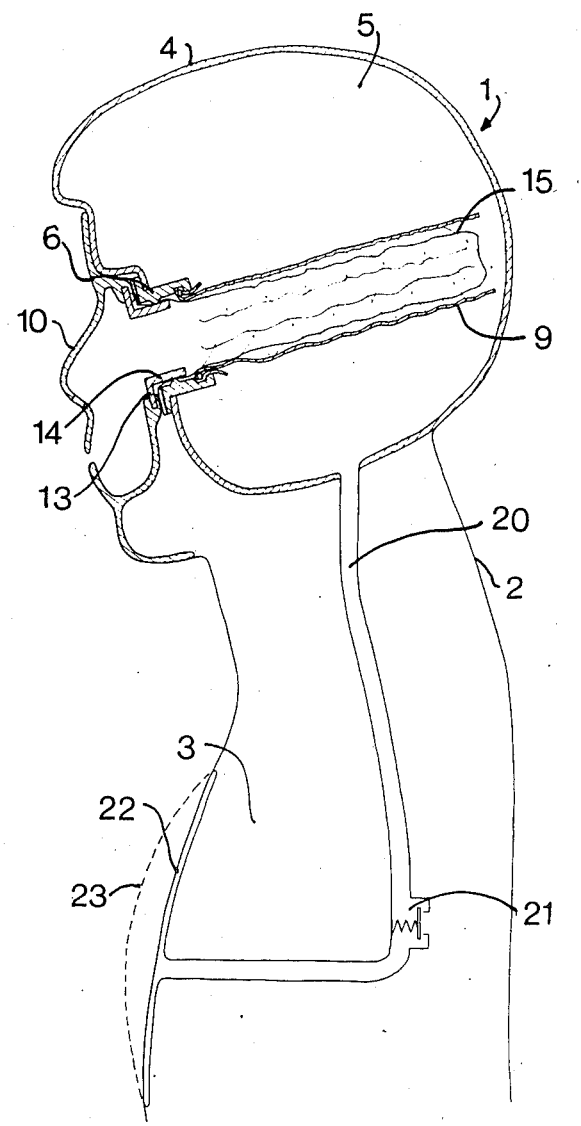

The invention will now be described in further detail with reference to the drawings in which FIG. 1 shows a sectional view of a preferred embodiment of a manikin according to the invention with a collapsed bag and a collapsed cover.

Figure 2:
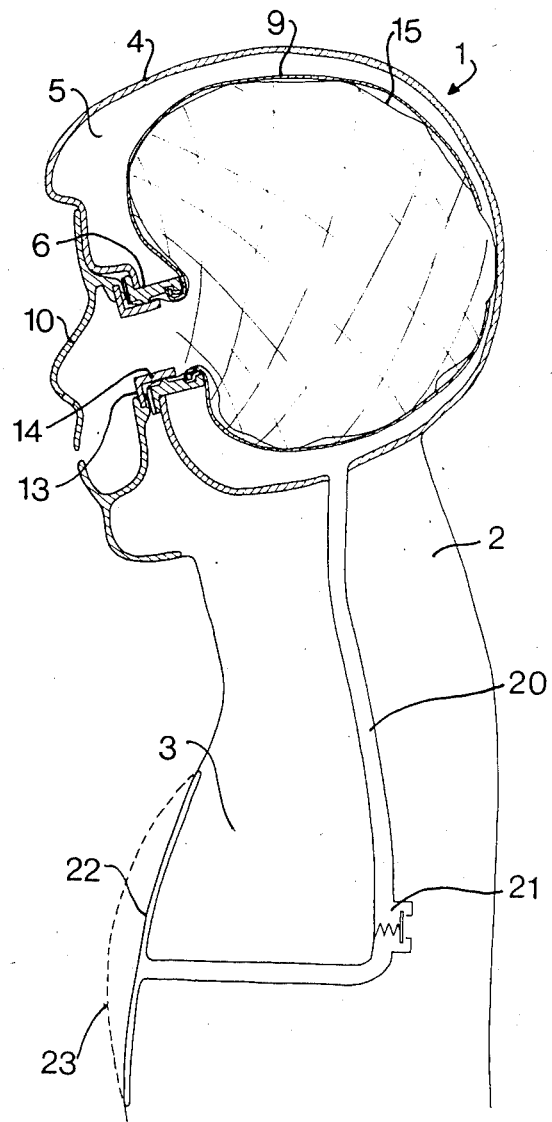
Figure 3:
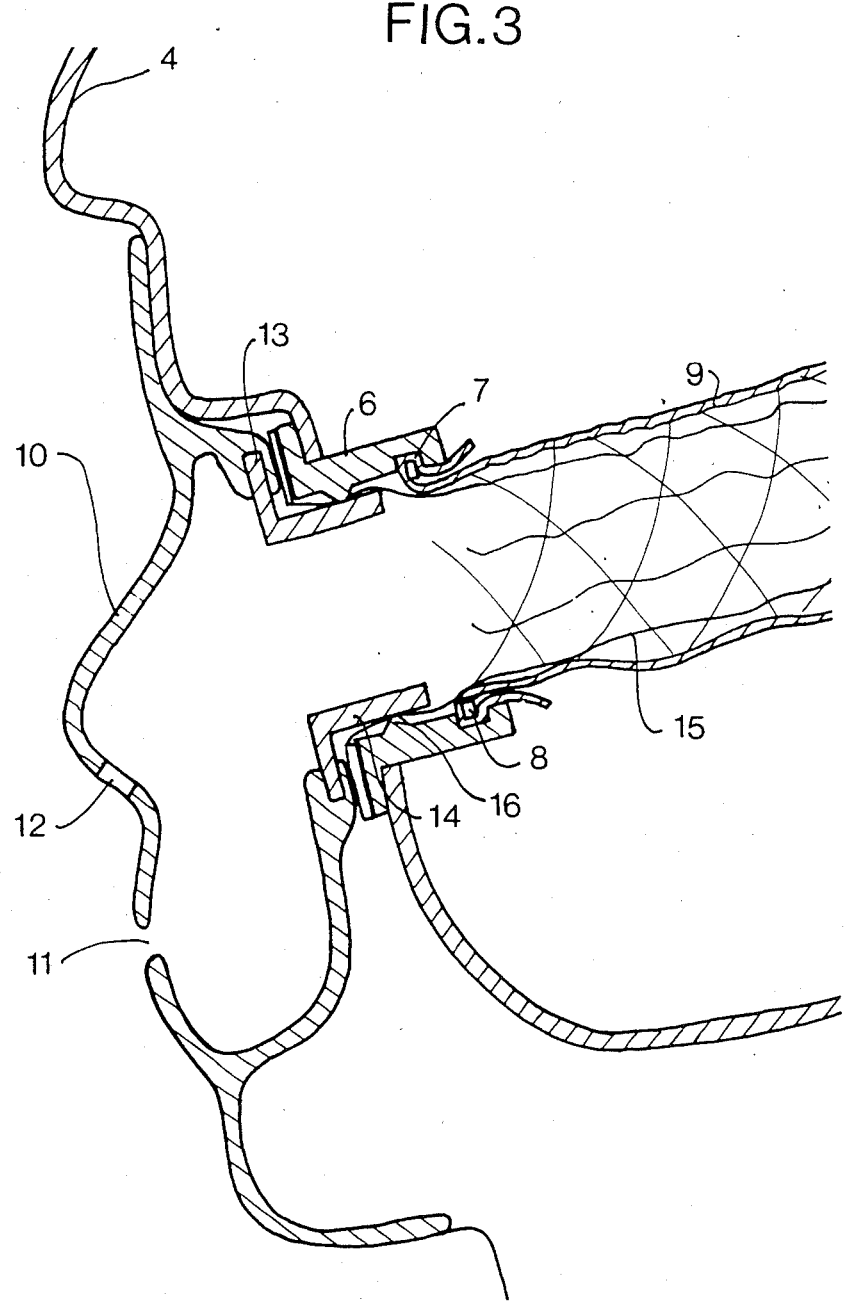

FIG. 2 shows a sectional view of the manikin according to FIG. 1 with an inflated bag and an expanded cover and FIG. 3 shows a sectional view of the nose and mouth element of the manikin according to the invention on an enlarged scale.

The manikin illustrated in the drawings comprises a head 1 which via a neck portion 2 is connected with a chest 3. The head 1 comprises a skull 4 having a cavity 5. The front side of the skull 4 comprises a hole, and a sealing ring 6, e.g. a rubber ring, is inserted in the hole. The inner side of the sealing ring 6 comprises an annular groove 7, and a ring 8, e.g. consisting of a hard plastic material, is mounted in the groove 7. The ring 8 maintains one end of a tubular, elastically expandable cover 9 in the groove 7. The opposite end of the tubular cover 9 is located close to the rear side of the skull 4 both in the state of rest (FIG. 1) and in its expanded state (FIG. 2).

The head 1 also comprises a replaceable mouth and nose element 10 e.g. made from soft plastic material and comprising a hole 11 simulating a mouth and openings 12 simulating nostrils.

The mouth and nose element 10 comprises an internal groove and a radially extending annular flange 13 of a bushing 14, e.g. made from a hard plastic material, is inserted in the annular groove. The bushing 14 is inserted in the opening of an inflatable bag 15, said bag 15 being maintained between the exterior side of the bushing 14 and an internal annular bead 16 on the sealing ring 6.

The manikin illustrated in the drawings also comprises an air duct 20 connected with the cavity 5 and comprising a spring activated one-way valve 21 which opens when the pressure within the air duct 20 decreases to a subatmospheric pressure. The air duct 20 is connected with a cavity 22 in the chest 3, said cavity 22 being covered by an expandable membrane 23.

The manikin illustrated is used in the following manner:

Before staring the use of the manikin the mouth and nose element 10 is removed together with the bushing 14 so as to allow a previously used bag 14, if any, to be removed and replaced with a new one together with a new mouth and nose element 10 and a bushing 14.

When the new mouth and nose element 10 has been correctly mounted the manikin is ready for use.

Depending on whether the practising of the artificial respiration is to be conducted by the mouth-to-nose or mouth-to-mouth method, the user blows air into the mouth and nose element 10 through the openings 12 and the hole 11, respectively, and the hole 13 or the openings 12 are covered by a finger.

By introducing air into the nose and mouth element 10, the bag 15 is caused to be inflated and the cover 9 is expanded.

During the inflation of the bag 15 air is pressed out of the skull 4 and into the air duct 20 and further into the cavity 22 so as to cause the membrane 23 to expand.

When the introduction of air into the mouth and nose element 10 is stopped the contraction of the membrane 23 covering the cavity 22 will cause the air to flow back into the cavity 5 in the skull 4 and the bag 15 will collapse.

The collapse of the bag 15 is caused partly by the superatmospheric pressure in the cavity 5 and partly by the cover 9 which contracts to its state of rest.

The state of rest of the cover 9 is predetermined and does not depend on leakages, if any, in the secondary air system.

If the flow of air through leakages, if any, in the secondary air system is too slow and a subatmospheric pressure is created in the system, air will pass into the system through the one-way valve 21.

Thus, the bag 15 will have the same content of air at the start of each practising cycle.

I claim:

1. A manikin for practicing artificial respiration by the mouth-to-mouth or mouth-to-nose method, said manikin comprising an inflatable element simulating a lung, an element simulating a chest and a hollow element simulating a head, said head element comprising a cavity containing a replaceable inflatable bag having an air inlet which is airtightly connected to a replaceable element simulating a mouth and nose, the cavity in the head being connected to the lung simulating element through an air duct, and wherein the bag is surrounded by an elastically expandable cover having a predetermined internal volume in its state of rest.

2. A manikin as in claim 1, wherein the cover is tubular.

3. A manikin as in claim 2, wherein the cover consists of a woven or knitted tubular body wholly or partially consisting of elastic threads or yarn.

4. A manikin as in claim 1 wherein the cover is permanently attached to the head element.

5. A manikin as in claim 1, wherein the air duct comprises a one-way valve allowing air to flow into the air duct when the pressure therein is subatmospheric.

* * * * *